(12) United States Patent
Setlur et al.

(10) Patent No.: US 9,256,858 B2
(45) Date of Patent: Feb. 9, 2016

(54) METHOD AND APPARATUS FOR ASSOCIATING CONTEXT INFORMATION WITH CONTENT

(75) Inventors: Vidya Raghavan Setlur, Portola Valley, CA (US); David Alexander Dearman, San Bruno, CA (US)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 13/534,736

(22) Filed: Jun. 27, 2012

(65) Prior Publication Data

US 2014/0006490 A1 Jan. 2, 2014

(51) Int. Cl.
*G06F 7/04* (2006.01)
*G06Q 10/10* (2012.01)
*G06F 21/10* (2013.01)

(52) U.S. Cl.
CPC ............... *G06Q 10/10* (2013.01); *G06F 21/10* (2013.01); *H04L 2209/603* (2013.01)

(58) Field of Classification Search
CPC .... H04L 2209/603; H04L 63/10; G06F 21/10
USPC ...................................... 709/204; 726/26–33
See application file for complete search history.

(56) References Cited

U.S. PATENT DOCUMENTS

| | | | |
|---|---|---|---|
| 2004/0143836 A1 | 7/2004 | McCormack et al. | |
| 2005/0086326 A1* | 4/2005 | Manning ................. | G06F 21/10 709/219 |
| 2007/0208668 A1* | 9/2007 | Candelore .......... | G06Q 20/3829 705/57 |
| 2008/0148067 A1* | 6/2008 | Sitrick .................. | H04L 9/0861 713/193 |
| 2008/0162353 A1* | 7/2008 | Tom ........................ | G06F 21/10 705/51 |
| 2008/0201649 A1 | 8/2008 | Mattila et al. | |
| 2008/0222192 A1 | 9/2008 | Hughes | |
| 2010/0073713 A1 | 3/2010 | Chae | |
| 2010/0235762 A1 | 9/2010 | Laiho et al. | |
| 2011/0179062 A1* | 7/2011 | Lee et al. ............... | G06Q 30/02 707/769 |
| 2012/0117662 A1* | 5/2012 | Cross et al. ........ | G06F 17/30067 726/28 |
| 2012/0210134 A1* | 8/2012 | Mitter ................... | H04L 9/0825 713/171 |
| 2012/0289147 A1* | 11/2012 | Raleigh et al. ...... | H04L 67/2847 455/3.06 |
| 2013/0103742 A1* | 4/2013 | Hsi .................... | G06F 17/30274 709/203 |
| 2013/0117364 A1* | 5/2013 | Bania ..................... | G06Q 30/02 709/204 |

(Continued)

FOREIGN PATENT DOCUMENTS

WO  WO-2005/057846 A1  6/2005
WO  WO-2011/107952 A1  9/2011

OTHER PUBLICATIONS

Guidelines for Handling Image Metadata, Version 2.0, Metadata Working Group, Nov. 2010, pp. 1-73.

(Continued)

*Primary Examiner* — Jeong S Park
(74) *Attorney, Agent, or Firm* — Alston & Bird LLP

(57) ABSTRACT

A method and apparatus are provided to facilitate sharing of content including, but not limited to, the sharing of content between people who are co-located. In the context of a method, an indication is received of the content to be shared with a recipient and context information indicative of an intended use of the content by the recipient is associated with the content. The method also causes a representation of the content and the associated context information to be shared with the recipient. The method may also generate the context information based on at least one of the location of the content, a recent action performed on the content or a change made to the content.

36 Claims, 8 Drawing Sheets

(56) References Cited

U.S. PATENT DOCUMENTS

2013/0181975 A1* 7/2013 Golden .................. G06T 17/00 345/419
2014/0006496 A1* 1/2014 Dearman ................ H04L 67/16 709/204

OTHER PUBLICATIONS

International Search Report and Written Opinion for Application No. PCT/FI2013/050628, dated Oct. 9, 2013.

* cited by examiner

METHOD AND APPARATUS FOR ASSOCIATING CONTEXT INFORMATION WITH CONTENT

TECHNOLOGICAL FIELD

An example embodiment of the present invention relates generally to the sharing of content and, more particularly, to the sharing of content in a manner in which context information indicative of an intended use of the content is associated with the content.

BACKGROUND

People oftentimes wish to share content with one another. For example, attendees of a meeting may share a document that is to be discussed at the meeting. Two or more people may view a movie or listen to music that is played by a laptop computer of one of the people. Frequently, one person may attach a file to an electronic message that is transmitted to another person in order to share the file with the other person. As the foregoing examples illustrate, people have found a number of different techniques in order to share, synchronize and consume content.

BRIEF SUMMARY

A method, apparatus and computer program product are provided according to an example embodiment in order to facilitate sharing of content including, but not limited to, the sharing of content between people who are co-located. In this regard, the method, apparatus and computer program product of one embodiment allow content to be shared in a manner that is relatively seamless and natural and does not require the people who are sharing the content to become involved with lower-level technical details underlying the sharing of the content. Instead, the method, apparatus and computer program product of an example embodiment permit content to be readily shared with a recipient, who may receive and utilize the content in the manner intended by the sender of the content. Thus, the sender and recipient of content shared in accordance with an example embodiment may collaborate in an efficient and straightforward manner.

In one embodiment, a method is provided that includes receiving an indication of the content to be shared with a recipient and associating, by a processor, context information with the content. The context information may be indicative of an intended use of the content by the recipient and, in one embodiment, may be the context of the sender relative to the content. The method of this embodiment also causes a representation of the content and the associated context information to be shared with the recipient. In one embodiment, the method may identify a respective one of a plurality of devices of the recipient based upon the intended use of the content such that the content and the associated context information may be shared with the respective one of the devices of the recipient. In one embodiment, the method may generate the context information based on at least one of the location of the content, a recent action performed on the content or a change made to the content, while in another embodiment, the method may receive the context information that is provided by a sender of the content.

The method of one embodiment also generates an icon to be shared with the recipient. The icon of this embodiment includes a representation of a substantive portion of the content or the associated context information. The method of one embodiment causes the representation of the content and the associated context information to be shared with the recipient by causing an identification of content that was previously shared with the recipient to be provided. In this embodiment, the method may cause the associated context information to be shared with the recipient by causing one or more manipulations or directives directing the processing of the content that was previously shared with the recipient to be provided to the recipient.

In another embodiment, an apparatus is provided that includes at least one processor and at least one memory including computer program code with the memory and the computer program code configured to, with the least one processor, cause the apparatus to receive an indication of content to be shared with a recipient. The memory and the computer program code of this embodiment are also configured to, with the at least one processor, cause the apparatus to associate context information with the content and to cause a representation of the content and the associated context information to be shared with the recipient. The context information may be indicative of an intended use of the content by the recipient and, in one embodiment, may be the context of the sender relative to the content.

The memory and the computer program code of one embodiment are further configured to, with the at least one processor, cause the apparatus to identify a respective one of a plurality of devices of the recipient based upon the intended use of the content. In this embodiment, the memory and the computer program code are configured to, with the at least one processor, cause the apparatus to cause a representation of the content and the associated context information to be shared with the recipient by causing the content and the associated context information to be shared with the respective one of the devices of the recipient.

The memory and the computer program code of one embodiment are further configured to, with the at least one processor, cause the apparatus to generate the context information based on at least one of the location of the content, a recent action performed on the content, or a change made to the content. In another embodiment, the memory and the computer program code are further configured to, with the at least one processor, cause the apparatus to receive the context information that is provided by a sender of the content. The memory and the computer program code of one embodiment are configured to, with the at least one processor, cause the apparatus to cause a representation of the content and the associated context information to be shared with a recipient by causing an identification of the content that was previously shared with the recipient to be provided. The memory and the computer program code of one embodiment are configured to, with the at least one processor, cause the apparatus to generate an icon to be shared with the recipient. The icon of this embodiment includes a representation of a substantive portion of the content or the associated context information.

In a further embodiment, a computer program product is provided that includes at least one non-transitory computer-readable storage medium having computer-executable program code portions stored therein with the computer-executable program code portions including program code instructions for receiving an indication of content to be shared with a recipient. The computer-executable program code portions of this embodiment also include program code instructions for associating context information with the content and computer code instructions for causing a representation of the content and the associated context information to be shared with the recipient. The context information may be indicative of an intended use of the content by the recipient.

In yet another embodiment, an apparatus is provided that includes means for receiving an indication of content to be shared with a recipient and means for associating context information with the content. The context information may be indicative of an intended use of the content by the recipient. The apparatus of this embodiment also includes means for causing a representation of the content and the associated context information to be shared with the recipient.

In one embodiment, a method is provided that includes receiving a representation of content shared by a sender along with context information indicative of an intended use of the content. In one embodiment, the context information may be the context of the sender relative to the content. The method also includes determining, by a processor, the intended use of the content based upon the context information and processing the content based upon the intended use of the content.

The method of one embodiment may process the content by accessing the content utilizing an application selected based upon the intended use of the content. For example, the method may access the content by loading the content utilizing the application selected based upon the intended use of the content. In an embodiment in which the content includes a document, the method may access the content by opening the document utilizing the application selected based upon the intended use of the content. The method of one embodiment may receive the representation of the content shared by the sender by receiving an identification of the content that was previously received from the sender. In this embodiment, the method may receive the context information by receiving one or more manipulations or directives directing the processing of the content that was previously received by the sender. In one embodiment, the method also receives an icon that is shared by the sender. The icon of this embodiment includes a representation of a substantive portion of the content or the associated context information.

In another embodiment, an apparatus is provided that includes at least one processor and at least one memory including computer program code with the memory and the computer program code configured to, with the at least one processor, cause the apparatus to receive a representation of content shared by a sender along with context information indicative of an intended use of the content. In one embodiment, the context information may be the context of the sender relative to the content. The memory and the computer program code of this embodiment are also configured to, with the at least one processor, cause the apparatus to determine the intended use of the content based upon the context information and to process the content based upon the intended use of the content.

The memory and the computer program code of one embodiment may be configured to, with the at least one processor, cause the apparatus to process the content by accessing the content utilizing an application selected based upon the intended use of the content. In this embodiment, the memory and the computer program code may be configured to, with the at least one processor, cause the apparatus to access the content by loading the content utilizing the application selected based upon the intended use of the content. In an instance in which the content includes a document, the memory and the computer program code may be configured to, with the at least one processor, cause the apparatus to access the content by opening the document and utilizing the application selected based upon the intended use of the content. The memory and the computer program code of one embodiment are also configured to, with the at least one processor, cause the apparatus to receive the representation of the content shared by the sender by receiving an indication of the content that was previously received from the sender. The memory and the computer program code of one embodiment are also configured to, with the at least one processor, cause the apparatus to receive an icon that is shared by the sender. The icon of this embodiment includes a representation of a substantive portion of the content or the associated context information.

In a further embodiment, a computer program product is provided that includes at least one non-transitory computer-readable storage medium having computer-executable program code portions stored therein with the computer-executable program code portions including program code portions for receiving a representation of content shared by a sender along with context information indicative of an intended use of the content. The computer-executable program code portions of this embodiment also include program code portions for determining the intended use of the content based upon the context information and program code instructions for processing the content based upon the intended use of the content.

In yet another embodiment, an apparatus is provided that includes means for receiving a representation of content shared by a sender along with context information indicative of an intended use of the content. The apparatus of this embodiment also includes means for determining the intended use of the content based upon the context information and means for processing the content based upon the intended use of the content.

BRIEF DESCRIPTION OF THE SEVERAL VIEWS OF THE DRAWINGS

Figure 1:
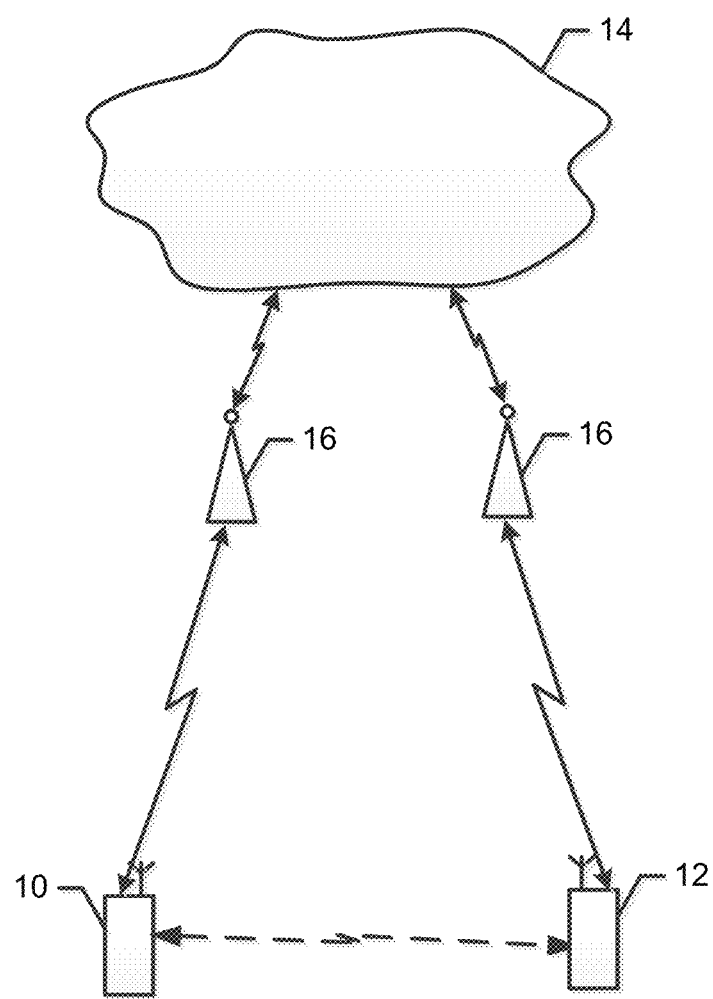
Figure 2:
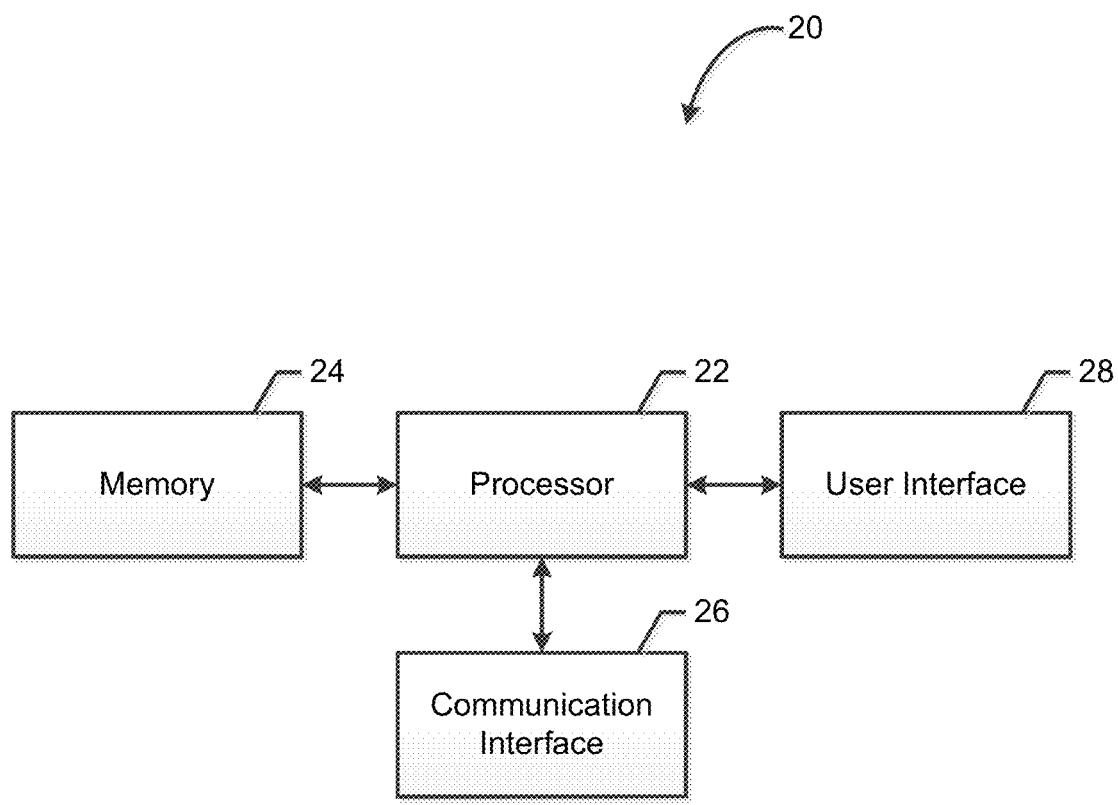
Figure 3:
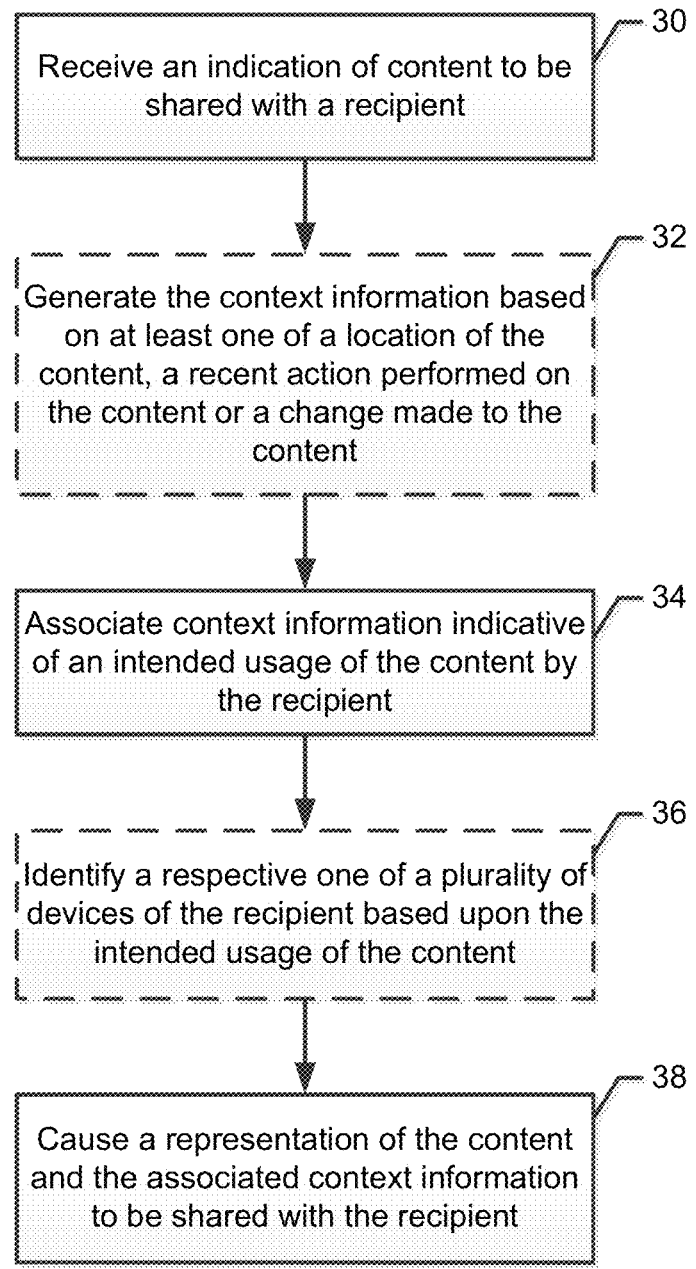
Figure 4:
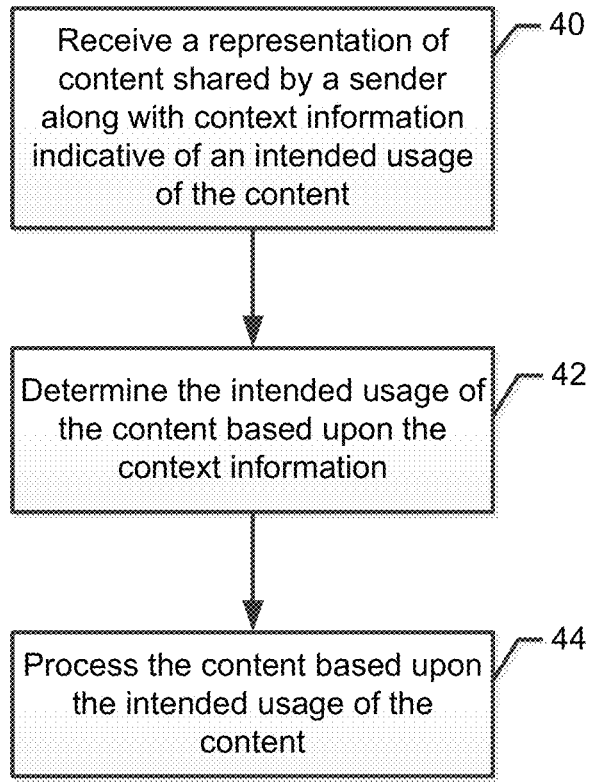
Figure 5:
Figure 6:
Figure 7:
Figure 8:
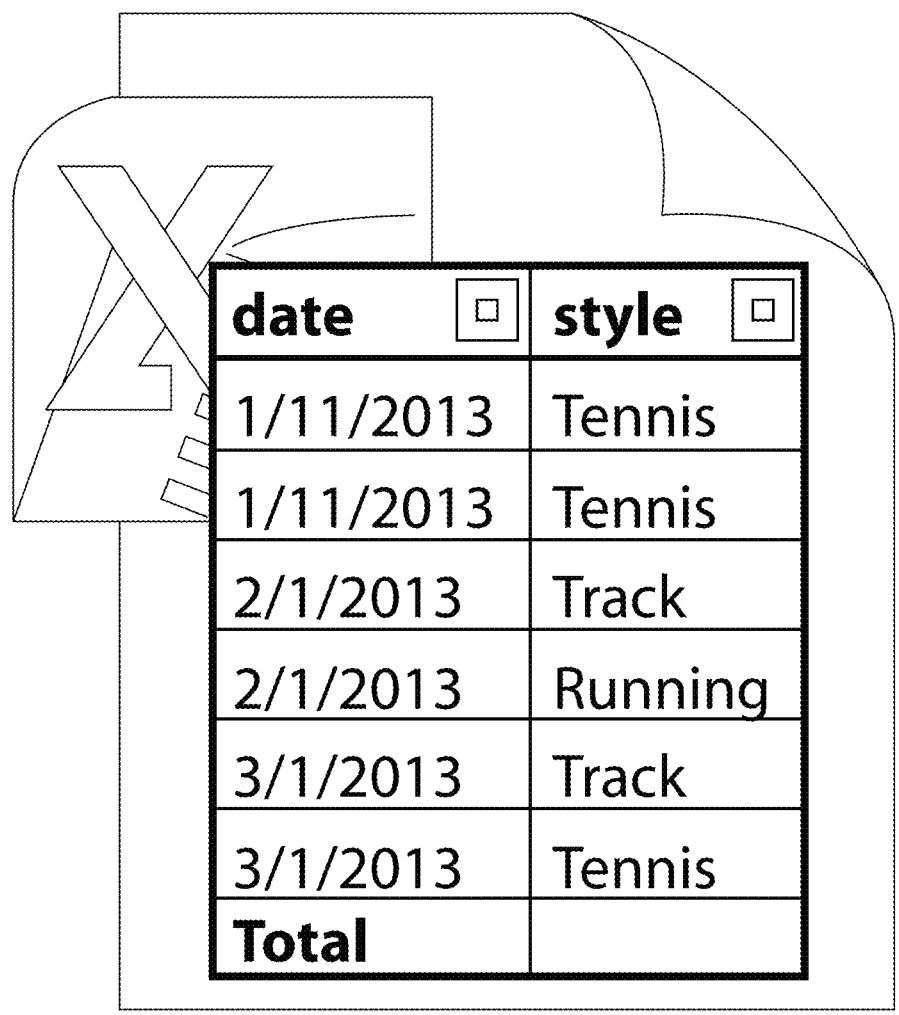

Having thus described certain embodiments of the invention in general terms, reference will now be made to the accompanying drawings, which are not necessarily drawn to scale, and wherein:

FIG. 1 is a schematic representation of a system including a sending device and a receiving device that may be specifically configured to share content in accordance with an example embodiment of the present invention;

FIG. 2 is a block diagram of an apparatus that may be specifically configured to share content, such as by either sending or receiving content, in accordance with an example embodiment of the present invention;

FIG. 3 is a block diagram of the operations performed by an apparatus that is specifically configured to share content with a recipient in accordance with an example embodiment of the present invention;

FIG. 4 is a block diagram illustrating the operations performed by an apparatus that is specifically configured to receive content shared by a sender in accordance with an example embodiment of the present invention;

FIG. 5 is an icon that includes an image representative of the content that has been shared in accordance with an example embodiment of the present invention;

FIG. 6 is an illustration of a screen display in which a notification message includes the icon of FIG. 5;

FIG. 7 is an icon that includes information regarding an activity that is requested in conjunction with a document associated with the icon in accordance with one embodiment of the present invention; and FIG. 8 is an icon including an image indicating content that has been added or revised in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical storage medium (e.g., volatile or non-volatile memory device), can be differentiated from a "computer-readable transmission medium," which refers to an electromagnetic signal.

In order to facilitate sharing of content, a number of services, such as a number of cloud-based services, have been developed. These services include, for example, Sketchpad™, Kaltura™, Spotify™, Evernote™, Canvas™, Google Docs™, Netflix™, Pixlr™, Dropbox™, box.net™, MobileMe™, Sharepoint™ services and the like. While these services support sharing between remotely located participants in an efficient manner, these services may not be optimized for content sharing between two or more people who are co-located. In this regard, people who are co-located oftentimes wish to share the content in a seamless and natural manner. In contrast, these content sharing services generally require prior setup and configuration and may impose time constraints upon the content sharing, thereby potentially deterring people who are co-located from sharing content utilizing these services. Instead, co-located people who wish to share content may resort to viewing the content together on a laptop computer or attaching the content to an email that is forwarded to one or more other people.

Alternatively, people who wish to share content may utilize Bluetooth™ or universal serial bus (USB) techniques in order to share the content with other people who are proximately located. However, the people sharing the content utilizing, for example, Bluetooth or USB techniques may be required to provide or otherwise be familiar with lower-level technical details, such as details regarding the manner in which to set up and enable the transfer of the content. The involvement with these lower-level technical details generally diminishes the user experience, particularly for co-located people since they impede their seamless and natural interaction.

A method, apparatus and computer program product are provided according to an example embodiment in order to facilitate sharing of content including, but not limited to, the sharing of content between people who are co-located. The content may be shared in a manner that is relatively seamless and natural and does not require the people who are sharing the content to become involved with lower-level technical details underlying the sharing of the content. Context information indicative of the intended use of the content may be associated with the content and shared with the recipient so that the recipient may receive and utilize the content in the manner intended by the sender of the content. Thus, the sender and recipient of content shared in accordance with an example embodiment may collaborate in an efficient and straightforward manner.

Content may be shared in accordance with a method and apparatus of an example embodiment between a sending device 10 and a receiving device 12. The sending device and the receiving device may communicate directly with one another, such as via device-to-device communications, Bluetooth communications, a wireless local area network (WLAN), other proximity based communications techniques or the like. Additionally or alternatively, the sending device and the receiving device may communicate via a communications network as shown in FIG. 1. In this regard, a system in accordance with an example embodiment of the present invention comprises the sending device in communication with the receiving device via a network 14.

The sending device 10 and the receiving device 12 may be the same type of device or may be different devices. In either instance, the sending device and the receiving device may be embodied in various manners, but, in one example embodiment, are embodied as a portable computing device, such as a laptop computer or a tablet computer, a fixed computing device, such as a personal computer or a workstation, a mobile telephone, a personal digital assistant (PDA), a USB or other dongle, a personal computer (PC) emulator card, a pager, a mobile television, a gaming device, an electronic book reader, a camera, an audio/video player, a radio, a global positioning system (GPS) device, or any combination of the aforementioned, and other types of communications devices.

While the sending device 10 and the receiving device 12 may be configured to communicate with the network 14 in various manners, the sending device and the receiving device of one embodiment are configured to communicate with the network via respective access points 16, such as a base station, a Node B, an evolved Node B (eNB) or the like. The network, in turn, may support communications in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like.

An example embodiment of an apparatus 20 that may be embodied by or comprise at least a portion of the sending device 10 and/or the receiving device 12 will now be described with reference to FIG. 2. It should be noted, however, that the devices or elements described below may not be mandatory and thus some may be omitted in certain embodiments. Referring now to FIG. 2, the apparatus of the illustrated embodiment may include or otherwise be in communication with a processor 22, a memory device 24, a communication interface 26 and a user interface 28. The memory device may comprise, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 20 may, in some embodiments, be a computing device as described above. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network 14 and/or between a sending device 10 and a receiving device 12. In this regard, the communication interface may comprise, for example, an antenna (or multiple antennas) and supporting hardware and/or software for enabling communications with a wireless communication network, e.g., WLAN. In some environments, the communication interface may alternatively or also support wired communication. As such, for example, the communication interface may comprise a communication modem and/or other hardware/software for supporting communication via cable, digital subscriber line (DSL), USB or other mechanisms.

The user interface 28 may be in communication with the processor 22 to receive an indication of a user input at the user interface and/or to provide an audible, visual, mechanical or other output to the user. As such, the user interface may comprise, for example, a keyboard, a mouse, a joystick, a display, a touch screen(s), touch areas, soft keys, a microphone, a speaker, or other input/output mechanisms. For example, the user interface may comprise, among other devices or elements, any or all of a speaker, a microphone, a display, and a keyboard or the like. In this regard, for example, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 24, and/or the like).

Referring now to FIG. 3, the operations performed by an apparatus 20 embodied by a sending device 10 (also referenced as a sender) are illustrated. As shown in block 30, the apparatus may be configured to receive an indication of content that is to be shared with a receiving device 12 (also referenced as a recipient). The indications of the content may be provided in various manners including selection of the content by a user, such as by double clicking an icon or other identifier associated with the content, or by copying the content onto a clipboard. Various types of content may be shared between the sending device and the receiving device. For example, the content may include documents, audio visual files, spreadsheets, images or the like. Thus, the apparatus may include means, such as the processor 22, the user interface 28 or the like, for receiving the indication of the content to be shared with the receiving device.

As shown in block 34 of FIG. 3, the apparatus 20 embodied by the sending device 10 is also configured to associate context information with the content. The context information may be indicative of an intended use of the content by the receiving device 12. The context information of one embodiment defines or otherwise indicates the context of the sender relative to the content. The apparatus may include means, such as the processor 22 or the like, for associating context information with the content that is indicative of the intended use of the content by the receiving device. In an instance in which the context information indicates the context of the sender, the context information that is indicative of the intended use of the content permits or directs the content to be utilized by the receiving device 12 in the same or in a complementary manner to the manner in which the content was utilized by the sending device 10. The context information may be provided in various forms, but, in one embodiment, metadata is provided that includes the context information and is associated with the content.

The apparatus 20 and, more particularly, the processor 22 of one embodiment may generate the context information in various manners with some examples being shown in block 32 of FIG. 3. In one embodiment, the processor may be configured to generate the context information based upon the location of the content on the sending device 10. For example, the processor may be configured to generate context information indicating whether the content is currently open on the sending device or is stored and, in an instance in which the content is stored, the location, e.g., the directory, the file, etc., in which the content is stored. As another example, the processor may generate context information based upon one or more recent actions performed on the content by the sending device. For example, the context information may indicate whether the content was recently received by the sending device, modified on the sending device, stored by the sending device, etc. In a further embodiment, the apparatus and, more particularly, the processor may generate context information based upon changes to the content. In this regard, the context information may indicate one or more changes to the content such as modifications, additions, deletions, etc. In one embodiment, the context information may indicate the most recent changes to the content or all changes to the content since the content was last shared with the receiving device 12. In another embodiment, the apparatus may receive the context information from the user of the sending device. In this embodiment, the user may provide input indicative of the intended use of the content by the receiving device for receipt by, for example, the processor, the user interface 28 or the like.

The context information is indicative of an intended use of the content by the recipient. For example, the location of the content on the sending device 10 may be indicative of the location that the content should be stored or otherwise located on the receiving device 12. As another example, context information regarding a recent action performed on the content may be indicative of an intent for the receiving device to perform the same action with respect to the content, such as by opening and editing the content in an instance in which the same content was recently opened and edited by the sending device. As a further example, context information regarding a change made to the content may be indicative of an intent for the receiving device display the content in a manner that permits the recent changes to the content to be viewed. For example with respect to textual content, recent changes may be highlighted or, for a multi-page document, the initial page on which changes have been made may be automatically displayed. With respect to content in the form of images, a visual cue may be provided in or proximate to a region in which the pixel(s) have been modified, such as by highlighting the pixels or zooming toward that portion of the image that has been modified.

As shown in block 38 of FIG. 3, the apparatus 20 embodied by the sending device 10 is also configured to cause a representation of the content and the associated context information to be shared with the receiving device 12. In this regard, the content itself as well as the associated context information may be shared with receiving device. Alternatively, such as in an instance in which the content was previously shared with the receiving device, the representation of the content need not include the content, but may include an identification of the content that was previously shared with the receiving device such that the receiving device may readily identify the previously provided content. Other types of representations of the content may also be shared by the sending device including, for example, a link to or address of a document or other file that includes the content. The representation of the content and the associated context information may be shared in various manners, such as via Bluetooth, a wireless local area network or other proximity based communications technique, or via, for example, a wired connection. Still further, the representation of content and the associated context information may be shared via a network 14, such as illustrated in FIG. 1. Thus, the apparatus may include means, such as the processor 22, the communications interface 26 or the like, for causing a representation of the content and the associated context information to be shared with the receiving device.

The identity of the receiving device 12 with which the content and the associated context information are shared may be provided in various manners. For example, the user of the sending device 10 may select one or more receiving devices from among a list of contacts provided by the sending device. Alternatively, the apparatus 20 embodied by the sending device and, more particularly, the processor 22 or the communications interface 26 of one embodiment of the sending device may identify potential receiving devices in proximity to the sending device, such as by utilizing any of various proximity-based discovery techniques. For example, the apparatus embodied by the sending device may identify the recipient device utilizing a wave-to-share technique, such as described by U.S. patent application Ser. No. 13/476,693 entitled Apparatus and Method for Detecting Proximate Devices filed on May 21, 2012, the contents of which are incorporated by reference herein. The content and the associated context information may then be shared with one or more receiving devices selected by the user of the sending device from among those in proximity to the sending device.

In one embodiment, the recipient may have a plurality of devices, such as a mobile telephone, a laptop computer, a tablet computer and the like, that are capable of receiving and interacting with the content and the associated context information. In this embodiment, apparatus 20 of the sending device 10 and, more particularly, the processor 22 or the communication interface 28 of one embodiment of the sending device may identify the plurality of devices of the recipient, such as based upon contact information maintained by the sending device or based upon the discovery of the plurality of devices of the recipient utilizing any of various discovery techniques. See block 36 of FIG. 3. Regardless of the manner in which the plurality of receiving devices are identified, the apparatus embodied by the sending device and, more specifically, the processor or the user interface 28 of one embodiment of the sending device may identify a respective one or more of the plurality of receiving devices 10 based upon the intended use of the content and may then cause the representative content and the associated context information to be shared with the one or more of the plurality of receiving devices that were identified. The one or more of the plurality of receiving devices that were identified may be identified automatically by the processor or manually by user input provided via the user interface with the one or more of the receiving devices that are identified being, for example, the one or more of the receiving devices that are best able to utilize the content that is to be shared in the manner that is intended. In one embodiment, the receiving devices may broadcast information regarding their available hardware and/or software capabilities, such as information regarding the available applications, to other devices. The information regarding the available hardware and/or software capabilities may permit the sending device and, more particularly, the processor of the sending device to determine which one(s) of the receiving devices would be suitable or most suitable for utilizing the content that is to be shared in the manner that is intended.

For example, in an instance in which the content is a document and the intended use of the content is to edit the content, such as indicated by the recent editing of the document by the sending device 10, a laptop computer of the recipient may be identified by the apparatus 20 embodied by the sending device to be the receiving device 12 that is to receive the content since the laptop computer may be better able to edit a document than the other devices, e.g., mobile telephone, music player, etc., of the recipient. As another example, in an instance in which the content includes one or more high resolution images that have recently be captured by the sending device such that the intended use of the content relates to viewing of the images, a tablet computer of the recipient may be identified by the apparatus embodied by the sending device to be the receiving device that is to receive the content since the tablet computer may have better resolution for viewing images than any of the other devices of the recipient.

In an instance in which the content has previously been provided to the receiving device 12 such that an identification of the content is provided by the apparatus 20 embodied by the sending device 10 along with the associated context information, the context information that is provided may include one or more manipulations or directives so as to direct the processing by the receiving device of the previously shared content. As such, even in an instance in which content has been previously shared, the sending device may provide information regarding the manner in which the previously shared content is to be manipulated by the receiving device. Additionally, in an instance in which the previously shared content has been modified since the time at which the content was previously shared, the entirety of the content need not again be shared, but, instead, only the portions of the content that has changed or been updated need be shared. In one embodiment, an icon may also be shared that is representative of the content and that indicates or depicts that the recently shared content includes only those portions of the content that has changed or been updated.

From the perspective of the receiving device 12 (also referred to as a recipient), reference is made to FIG. 4 and the operations represented thereby. In this regard, block 40 of FIG. 4 illustrates that the apparatus 20 embodied by the receiving device is configured to receive the representation of the content shared by the sending device 10 along with content information indicative of an intended use of the content. As such, the apparatus embodied by the receiving device may include means, such as the processor 22, the communication interface 26 or the like, for receiving a representation of the content shared by the sending device along with the context information. The context information represents the context associated with the content from the perspective of the sending device. As described above, the representation of the content may be the content itself or an identification of content that was previously received from the sending device. In this regard, in an instance in which the representation of the content includes an identification of the content that was previously received from the sending device, the context information that is associated therewith may, in one embodiment, include one or more manipulations or directives directing the processing of the previously shared content by the receiving device.

The apparatus 20 embodied by the receiving device 12 may also be configured to determine the intended use of the content based upon the context information. See block 42 of FIG. 4. As described above, various types of context information may be provided that is indicative of the intended use of the content. In one example embodiment in which the context information indicates the location of the content on the sending device 10, the apparatus embodied by the receiving device may determine that the intended use of the content is to store the content in the same or similar location as that in which the content is stored by the sending device. In another embodiment in which the context information indicates a recent action performed on the content by the sending device, the apparatus embodied by the receiving device may determine the intended use of the content is to perform the same or similar action on the content, thereby determining the application that should be utilized to open or otherwise access the content. In a further embodiment in which the context information indicates a change made to the content, the apparatus embodied by the receiving device may determine that the intended use of the content is to review the change made to the content, thereby determining the type of application that should be utilized to open or otherwise view the content. As such, the apparatus embodied by the receiving device may include means, such as the processor 22 or the like, for determining the intended use of the content based upon the context information.

The apparatus 20 embodied by the receiving device 12 may also be configured to process the content based on the intended use of the content. See block 44 of FIG. 4. For example, in an instance in which the intended use is to store the content in a location that is the same or similar to the location in which the content is stored by the sending device 10, the apparatus embodied by the receiving device may process the content by storing the content in the intended location. As another example, in an instance in which the intended use of the content is based upon a recent action performed on the content, the apparatus embodied by the receiving device may process the content by opening or otherwise accessing the content with an application that allows for the same or similar actions to be performed on the content by the receiving device as were previously performed on the content by the sending device. In yet another embodiment in which the intended use of the content is to review a change that has been made to the content on the sending device, the apparatus embodied by the receiving device may process the content by opening or otherwise accessing the content with an application that permits the change made to the content by the sending device to be viewed by the receiving device. Thus, the apparatus embodied by the receiving device includes means, such as the processor 22 or the like, for processing the content in accordance with the intended use of the content.

By way of an example, four people may be collaborating to write a document. A first person may send the completed document to a second person to proofread, to a third person to edit the data within a chart and a fourth person to edit a reference. The context information that is associated with the document may be provided, in this embodiment, by the first person so as to identify the action that the recipient is to perform on the document. For example, a background service akin to an application manager may maintain and provide a global context by identifying the currently active applications opened by the first person as well as the current state of the clipboard so as to track cut, copy and/or paste-type operations. As another example, applications opened by the first person may maintain and provide a local context by keeping track of a list of actions to have been performed. Metadata associated with the respective applications or with elements of the respective applications, e.g., an image inserted within a Word document, may maintain the local context. By way of example, Adobe® applications, such as a Photoshop™ application, keeps track of actions that a user has performed in a file. In either instance, the context, such as the global context or the local context may be exported programmatically. The global context or the local context are then available for import, such as within the loading application of the recipients. The action that the recipient is to perform on the document may be determinable from the global context or the local context including, for example, the state of the applications and/or the prior actions that the first person has performed on the applications.

As such, the receiving device of the second person may open the document with a Word application that provides for the best proofing and commenting capabilities for the document. The receiving device of the third person may open the document with both Word and Excel applications, with the Word application opening the document to the page that includes the chart to be edited and the Excel application permitting access and manipulation of the data within the table to facilitate editing of the data. Further, the receiving device of the fourth person need not open the document, but may utilize a reference application, such as an EndNote™ application, to allow editing of the reference for the documents.

In another example, two people may be collaborating to write a document. A first person may send an illustration to a second person with the intent that the second person will add text to the illustration. The sending device 10 of the first person may recognize that the second person has two potential receiving devices 12, such as a mobile telephone and a laptop computer, and may recognize that the laptop computer is better suited for editing the illustration since the laptop computer includes a Photoshop™ application installed thereon. As such, when the sending device of the first person shares the illustration with the second person, the content will be delivered to the laptop computer of the second person. The context information associated with the illustration may inform the laptop computer of the second person that the illustration is to be edited such that the application that loads the illustration should support editing of the illustration. As such, a Photoviewer™ application which may be the default system application for an illustration will not load the illustration because the Photoviewer™ application does not support the rich editing capabilities desired for the illustration and, instead, a Photoshop™ application may be utilized to load the illustration since the Photoshop™ application does support rich photo editing.

Continuing with the foregoing example, but considering the instance in which the illustration was previously shared by the first person with the second person, the illustration need not again be shared, but, instead, an identification of the previously shared illustration along with the context information indicative of the intended use of the illustration may be provided to the receiving device 12. In this regard, the previously shared content may be stored in the history of the sending device 10 along with associated file attributes, such as a file name and a time stamp, from which the sending device may determine whether the previously shared content has remained the same or has been modified. As such, the same content need not be repeatedly shared between the sending device 10 and the receiving device which may, among other things, increase the speed with which the associated context information is shared, particularly over slower network connections.

By facilitating the sharing of content along with associated context information indicative of the intended use of the content, the context information may be leveraged to allow for more effective content editing and/or consumption as well as to support activity continuation so that an activity performed with the content by the sending device 10 continues following its sharing with a receiving device 12. In this regard, the content may be opened or otherwise accessed by a suitable application of the receiving device in order to facilitate the intended use of the content, as opposed to a default or other application. Thus, the efficiency with which the receiving device may access the content and perform the desired action with respect to the content may be increased. Additionally, the identification of previously shared content permits context information including, for example, manipulations and directives to be provided to the receiving device without having to again share the same content.

In order to further facilitate the efficient use and access of content that is shared with a receiving device 12, the content may be associated with or represented by an icon that may be configured to provide information regarding the content itself, such as a substantive portion of the content, and/or the associated context information. The information regarding the content may be in addition to an indication of the type of content or the application with which the content was generated, that is, in addition to an indication that the content is a Word document, an Excel spreadsheet or the like. In this regard, once the content to be shared has been indicated, such as by selection by the sending device 10, the apparatus 20 embodied by the sending device and, more particularly, the processor 22 of one embodiment may generate an icon representative of the content and may include information regarding a substantive portion of the content or the context information indicative of the intended use of the content to be included within the icon. The sending device may then provide the resulting icon to the receiving device along with the representation of the content and the associated context information. By generating and providing an icon that includes information regarding a substantive portion of the content and/or the associated context information, the provision of context information regarding the sender's context may be made even more immediate, tangible and meaningful for the recipient.

In one embodiment, the icon may include part of the substance of the content itself, such as an image that is included within the content and that provides a visual indication of the content. For example, in an instance in which the content is a Word document that includes an embedded image of a laboratory, the resulting icon may not only indicate that the content is a Word document, but may include a thumbnail or other representation of the image of the laboratory, as shown in FIG. 5. Upon receipt, the icon may be displayed by the apparatus 20 embodied by the receiving device 12 and, in one embodiment, may be displayed by the processor 22, the user interface 28 or the like such that the recipient may gain an appreciation for the content based upon the information included within the icon without having to access the underlying content. In this regard, a recipient may determine whether to access the content based upon the information provided by the icon. In addition, in an instance in which the recipient does decide to access the content, the information provided by the icon may permit the recipient to have appropriate expectations for the content based upon the information included within the icon. While the icon including information regarding a substantive portion of the content or the associated context information may be presented in various manners by the receiving device including, for example, upon a home screen of the receiving device, the icon may be associated with and presented as part of a notification as shown in FIG. 6 indicating that content has been shared by the sending device 10.

As another example in which the content is a portable document format (PDF) document to be signed by the recipient, the icon that is generated by the apparatus 20 embodied by the sending device 10 may not only indicate that the document is a pdf document, but may include information, such as the image of the hand holding a pencil, to indicate that the recipient is to sign the document. See FIG. 7. As such, a recipient of the content and the associated context information may view the icon representative of a substantive portion of the content and may understand that the recipient is to access the pdf document and to sign the pdf document.

As yet another embodiment, the content may be an Excel document that was previously provided to the receiving device 12. However, the sender may have added a new table to the Excel document and, as such, may again wish to share the revised document with receiving device. In this regard, the icon that is generated by the apparatus 20 embodied by the sending device 10 and, more particularly, by the processor 22 of one embodiment of the sending device to represent the content and the associated context information may include information, such an image or other representation of the updated information, such as an image of the new table that was added. In order to further highlight the new table, the remainder of the icon that indicates that the document is an Excel document may be faded or otherwise presented in a manner that is less prominent than the new table. As such, a recipient that receives the Excel document and the associated context information and views the corresponding icon may quickly determine that a new table has been added to the Excel document, thereby assisting the recipient in determining the reason for the Excel document to again be provided to the recipient and focusing the recipient's review of the Excel document upon the new table.

As described above, a method, apparatus and computer program product are provided according to an example embodiment in order to facilitate sharing of content including, but not limited to, the sharing of content between people who are co-located. In one embodiment, the method, apparatus and computer program product allow content to be shared in a manner that is relatively seamless and natural and does not require the people who are sharing the content to become involved with lower-level technical details underlying the sharing of the content. Instead, the sharing of the content and the associated context information with the recipient permits the recipient to receive and utilize the content in the manner intended by the sender of the content. Thus, the sender and recipient of content shared in accordance with an example embodiment may collaborate in an efficient and straightforward manner.

As described above, FIGS. 3 and 4 are flowcharts of a method, apparatus and program product from the perspective of a sending device 10 and a receiving device 12, respectively, according to example embodiments of the invention. It will be understood that each block of the flowchart, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks. These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing circuitry (e.g., processor) to perform an example embodiment. In some cases, a general purpose computer may be configured to perform the functions shown in FIGS. 3 and 4 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included as shown, for example, by the blocks with dashed borders in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an indication of content to be shared with a recipient;
   associating, by a processor, context information with the content, wherein the context information is indicative of an intended use of the content by the recipient;
   determining, by the processor, a type of application operable to interact with the content based upon the intended use of the content;
   identifying a respective one of a plurality of devices of the recipient based upon the type of application and the device of the recipient that is best able to make the intended use of the content; and
   causing a representation of the content and the associated context information to be shared with the respective one of the devices of the recipient.

2. A method according to claim 1 further comprising generating the context information based on at least one of location of the content, a recent action performed on the content or a change made to the content.

3. A method according to claim 1 wherein the context information is provided by a sender of the content.

4. A method according to claim 1 wherein the context information is representative of the context of a sender relative to the content.

5. A method according to claim 1 further comprising generating an icon to be shared with the recipient, wherein the icon includes a representation of a substantive portion of the content or the associated context information.

6. A method according to claim 1 wherein causing a representation of the content and the associated context information to be shared with the recipient comprises causing an identification of the content that was previously shared with the recipient to be provided.

7. A method according to claim 6 wherein causing the associated context information to be shared with the recipient comprises causing one or more manipulations or directives directing the processing of the content that was previously shared with the recipient to be provided to the recipient.

8. A method according to claim 1 wherein the context information includes information regarding whether the content is open or stored, information regarding a storage location of the content, information regarding one or more recent actions performed on the content or information regarding one or more changes to the content.

9. A method according to claim 1 further comprising receiving information regarding available hardware or software capabilities of the recipient, and wherein identifying a respective device of the recipient comprises identifying the respective device of the recipient based upon the available hardware and software capabilities of the recipient.

10. A method comprising:
    causing information regarding available hardware or software capabilities of each of a plurality of devices of a recipient to be provided to a sender;
    receiving a representation of content shared by the sender along with context information indicative of an intended use of the content that will utilize the available hardware or software capabilities of the device of the recipient that was identified to be best able to make the intended use of the content;
    determining, by a processor, the intended use of the content based upon the context information and a type of application operable to interact with the content based upon the intended use of the content; and
    processing the content based upon the intended use of the content and the type of application operable to interact with the content.

11. A method according to claim 10 wherein the context information is representative of the context of the sender relative to the content.

12. A method according to claim 10 further comprising receiving an icon that is shared by the sender, wherein the icon includes a representation of a substantive portion of the content or the associated context information.

13. A method according to claim 10 wherein processing the content comprises accessing the content utilizing an application selected based upon the intended use of the content.

14. A method according to claim 13 wherein accessing the content comprises loading the content utilizing the application selected based upon the intended use of the content.

15. A method according to claim 13 wherein the content comprises a document, and wherein accessing the content comprises opening the document utilizing the application selected based upon the intended use of the content.

16. A method according to claim 10 wherein receiving the representation of the content shared by the sender comprises receiving an identification of the content that was previously received from the sender.

17. A method according to claim 16 wherein receiving the context information comprises receiving one or more manipulations or directives directing the processing of the content that was previously received by the sender.

18. A method according to claim 10 wherein the context information includes information regarding whether the content is open or stored, information regarding a storage location of the content, information regarding one or more recent actions performed on the content or information regarding one or more changes to the content.

19. A method according to claim 10 wherein the information regarding available hardware or software capabilities includes information regarding available applications.

20. An apparatus comprising at least one processor and at least one memory including computer program code, the memory and the computer program code configured to, with the at least one processor, cause the apparatus to:
    receive an indication of content to be shared with a recipient;
    associate context information with the content, wherein the context information is indicative of an intended use of the content by the recipient;
    determine a type of application operable to interact with the content based upon the intended use of the content;
    identify a respective one of a plurality of devices of the recipient based upon the type of application and the device of the recipient that is best able to make the intended use of the content; and
    cause a representation of the content and the associated context information to be shared with the respective one of the devices of the recipient.

21. An apparatus according to claim 20 wherein the memory and the computer program code are further configured to, with the at least one processor, cause the apparatus to generate the context information based on at least one of location of the content, a recent action performed on the content or a change made to the content.

22. An apparatus according to claim 20 wherein the context information is provided by a sender of the content.

23. An apparatus according to claim 20 wherein the context information is representative of the context of the sender relative to the content.

24. An apparatus according to claim 20 wherein the memory and the computer program code are further configured to, with the at least one processor, cause the apparatus to generate an icon to be shared with the recipient, wherein the icon includes a representation of a substantive portion of the content or the associated context information.

25. An apparatus according to claim 20 wherein the memory and the computer program code are configured to, with the at least one processor, cause the apparatus to cause a representation of the content and the associated context information to be shared with the recipient by causing an identification of the content that was previously shared with the recipient to be provided.

26. An apparatus method according to claim 20 wherein the context information includes information regarding whether the content is open or stored, information regarding a storage location of the content, information regarding one or more recent actions performed on the content or information regarding one or more changes to the content.

27. An apparatus according to claim 20 wherein the memory and the computer program code are further configured to, with the at least one processor, cause the apparatus to receive information regarding available hardware or software capabilities of the recipient, and wherein the memory and the computer program code are configured to, with the at least one processor, cause the apparatus to identify a respective device of the recipient by identifying the respective device of the recipient based upon the available hardware and software capabilities of the recipient.

28. An apparatus comprising at least one processor and at least one memory including computer program code, the memory and the computer program code configured to, with the at least one processor, cause the apparatus to:
cause information regarding available hardware or software capabilities of each of a plurality of devices of a recipient to be provided to a sender;
receive a representation of content shared by the sender along with context information indicative of an intended use of the content that will utilize the available hardware or software capabilities of the device of the recipient that was identified to be best able to make the intended use of the content;
determine the intended use of the content based upon the context information and a type of application operable to interact with the content based upon the intended use of the content; and
process the content based upon the intended use of the content and the type of application operable to interact with the content.

29. An apparatus according to claim 28 wherein the context information is representative of the context of the sender relative to the content.

30. An apparatus according to claim 28 wherein the memory and the computer program code are further configured to, with the at least one processor, cause the apparatus to receive an icon that is shared by the sender, wherein the icon includes a representation of a substantive portion of the content or the associated context information.

31. An apparatus according to claim 28 wherein the memory and the computer program code are configured to, with the at least one processor, cause the apparatus to process the content by accessing the content utilizing an application selected based upon the intended use of the content.

32. An apparatus according to claim 31 wherein the memory and the computer program code are configured to, with the at least one processor, cause the apparatus to access the content by loading the content utilizing the application selected based upon the intended use of the content.

33. An apparatus according to claim 31 wherein the content comprises a document, and wherein the memory and the computer program code are configured to, with the at least one processor, cause the apparatus to access the content by opening the document utilizing the application selected based upon the intended use of the content.

34. An apparatus according to claim 28 wherein the memory and the computer program code are configured to, with the at least one processor, cause the apparatus to receive the representation of the content shared by the sender by receiving an identification of the content that was previously received from the sender.

35. An apparatus according to claim 28 wherein the context information includes information regarding whether the content is open or stored, information regarding a storage location of the content, information regarding one or more recent actions performed on the content or information regarding one or more changes to the content.

36. An apparatus according to claim 28 wherein the information regarding available hardware or software capabilities includes information regarding available applications.

* * * * *